United States Patent
Vial et al.

(10) Patent No.: US 9,828,975 B2
(45) Date of Patent: Nov. 28, 2017

(54) FLOW REGULATING SYSTEM FOR SUPPLYING PROPELLANT FLUID TO AN ELECTRIC THRUSTER OF A SPACE VEHICLE

(71) Applicant: SNECMA, Paris (FR)

(72) Inventors: Vanessa Vial, Vernon (FR); Anthony Lorand, Notre Dame de l'isle (FR); Kevin Giboudeaux, Gareoult (FR); Vaitua Leroi, Strasbourg (FR)

(73) Assignee: SNECMA, Paris (FR)

( * ) Notice: Subject to any disclaimer, the term of this patent is extended or adjusted under 35 U.S.C. 154(b) by 4 days.

(21) Appl. No.: 15/103,240

(22) PCT Filed: Dec. 9, 2014

(86) PCT No.: PCT/FR2014/053238
§ 371 (c)(1),
(2) Date: Jun. 9, 2016

(87) PCT Pub. No.: WO2015/086982
PCT Pub. Date: Jun. 18, 2015

(65) Prior Publication Data
US 2017/0159647 A1    Jun. 8, 2017

(30) Foreign Application Priority Data

Dec. 11, 2013    (FR) ..................... 13 62430

(51) Int. Cl.
*F03H 1/00* (2006.01)
*B64G 1/40* (2006.01)

(52) U.S. Cl.
CPC ........... *F03H 1/0012* (2013.01); *B64G 1/402* (2013.01); *B64G 1/405* (2013.01); *F03H 1/0031* (2013.01); *F03H 1/0062* (2013.01)

(58) Field of Classification Search
CPC .... F03H 1/0012; F03H 1/0031; F03H 1/0062; B64G 1/402; B64G 1/405
See application file for complete search history.

(56) References Cited

U.S. PATENT DOCUMENTS

| | | | | |
|---|---|---|---|---|
| 4,979,119 A | * | 12/1990 | Perdu | ..................... B64G 1/402 700/282 |
| 5,064,153 A | * | 11/1991 | Gindre | ................... B64G 1/402 137/154 |

(Continued)

FOREIGN PATENT DOCUMENTS

FR    2973081 A1    9/2012

OTHER PUBLICATIONS

International Search Report in corresponding International Application No. PCT/FR2014/053238 dated May 4, 2015 (6 pages—English Translation included).

*Primary Examiner* — Calvin Cheung
(74) *Attorney, Agent, or Firm* — Bookoff McAndrews, PLLC

(57) ABSTRACT

A system for regulating the flow rate of a propellant fluid for an electrical thruster of a space vehicle, the vehicle including a tank of propellant fluid and a flow rate regulator connected to the outlet of said tank;

the flow rate regulator including a heater element controlled by a computer and adapted to heat the propellant fluid and to modify its physical properties so as to vary the flow rate of propellant fluid leaving the tank;

said system being characterized in that the computer also includes a plurality of empirical calibration curves that have been determined empirically for defining the flow rate of propellant fluid as a function of the magnitude of heating and (Continued)

as a function of environmental parameters, such that said computer also performs a function of determining the flow rate of the propellant fluid.

10 Claims, 1 Drawing Sheet

(56) References Cited

U.S. PATENT DOCUMENTS

| | | | | |
|---|---|---|---|---|
| 5,071,093 | A * | 12/1991 | Perdu | B64G 1/402 137/209 |
| 5,582,366 | A * | 12/1996 | Hamant | B64F 1/28 137/209 |
| 6,301,876 | B1 * | 10/2001 | Back | F03H 1/0012 60/202 |
| 6,695,256 | B2 * | 2/2004 | Zeender | B64G 1/002 244/135 R |
| 7,575,200 | B2 * | 8/2009 | Behrens | B64G 1/1078 244/172.3 |
| 7,647,951 | B2 * | 1/2010 | Larsson | B67D 7/048 141/290 |
| 8,019,494 | B1 * | 9/2011 | Mango | B64G 1/401 60/250 |
| 8,590,404 | B2 * | 11/2013 | Brantley | G01N 21/3504 73/863.23 |
| 8,781,652 | B2 * | 7/2014 | Vu | B64G 1/402 244/135 A |
| 2002/0175247 | A1 | 11/2002 | Zeender et al. | |
| 2003/0055579 | A1 * | 3/2003 | Srinivasan | G01F 1/002 702/45 |
| 2008/0142639 | A1 * | 6/2008 | Jallade | B64G 1/402 244/172.2 |
| 2009/0234596 | A1 * | 9/2009 | Kawasaki | F17C 13/026 702/55 |
| 2009/0242704 | A1 * | 10/2009 | D'Ausilio | B64G 1/007 244/172.5 |
| 2013/0119204 | A1 * | 5/2013 | Allen | B64G 1/64 244/172.5 |
| 2017/0160120 | A1 * | 6/2017 | Core | G01F 22/00 |

* cited by examiner

FLOW REGULATING SYSTEM FOR SUPPLYING PROPELLANT FLUID TO AN ELECTRIC THRUSTER OF A SPACE VEHICLE

CROSS-REFERENCE TO RELATED APPLICATIONS

This application is the U.S. national phase entry under 35 U.S.C. §371 of International Application No. PCT/FR2014/053238, filed on Dec. 9, 2014, which claims priority to French Patent Application No. 1362430, filed on Dec. 11, 2013.

GENERAL TECHNICAL FIELD

The present invention relates to the field of electrical thrusters such as in particular Hall effect engines, and more precisely to the field of means for controlling the flow rate of propellant fluid delivered to an electrical thruster in the context of an application for a space vehicle.

STATE OF THE ART

In electrical thrusters, the propellant fluid is stored within a tank. The tank is provided with and connected to control means in order to deliver a given flow rate to ensure proper operation of the electrical thruster.

Such control means typically comprise a flow rate regulator commonly referred to as a flow control unit (FCU) or as a xenon flux controller (XFC) when the propellant fluid is xenon, which regulator performs controlled heating of the fluid by means of a thermocapillary tube in order to modify the physical properties of the fluid, and thus its flow rate at the outlet from the tank.

Nevertheless there is no relationship for reliably establishing a correlation between the heating current of the thermocapillary tube and the outgoing flow rate, while also taking account of the variables that influence this relationship, and in particular environmental parameters representing the ambient conditions in which the flow rate regulator is used.

An independent flowmeter is thus commonly associated with the flow rate regulator, in order to measure the actual outgoing flow rate.

Nevertheless, in space applications, such an increase in components for the purpose of performing a simple flow rate regulator function is problematic in that it adds additional mass, which is highly constraining, given the power needed to launch a given mass into geo-stationary orbit.

A known alternative consists in estimating the mass of propellant remaining by an analytical method, e.g. on the basis of the pressure and the temperature within the tank, in order to determine consumption over time. Such a method makes it possible to avoid installing a flowmeter, but is nevertheless not very accurate, and in order to conserve a safety margin, space vehicles that use such a method must therefore be put into end-of-life before the real end of total consumption of the propellant fluid.

SUMMARY OF THE INVENTION

The present invention seeks to find an at least partial solution to this problem, by proposing a system for regulating the flow rate of a propellant fluid for an electrical thruster of a space vehicle, the vehicle including a tank of propellant fluid and a flow rate regulator connected to the outlet of said tank;

the flow rate regulator including a heater element controlled by a computer and adapted to heat the propellant fluid and to modify its physical properties so as to vary the flow rate of propellant fluid leaving the tank;

said system being characterized in that the computer includes a storage memory having loaded therein a plurality of empirical calibration curves that have been determined empirically for defining the flow rate of propellant fluid as a function of the magnitude of heating and as a function of environmental parameters, such that said computer also performs a function of determining the flow rate of the propellant fluid.

The present invention thus makes it possible to combine the flow rate regulation function and the flowmeter function in a single component, namely a flow rate regulator, without requiring structural modifications thereto, thereby reducing the total mass of the system compared with a conventional system having two distinct components, while also presenting accuracy that is better than that of a system that determines the flow rate from theoretical relationships.

In a particular embodiment, the empirical calibration curves are determined on the ground by testing said regulator system under various environmental parameters.

The computer may also have a plurality of semi-empirirical calibration curves that are calculated on the basis of said empirical calibration curves, said semi-empririrical calibration curves defining the propellant fluid flow rate as a function of the magnitude of heating for environmental parameters that are different from those of the empirical calibration curves.

The computer may be configured to use said empirical calibration curves to calculate a semi-empririrical calibration curve defining the flow rate of propellant fluid as a function of the magnitude of heating and of environmental parameters.

By way of example, said heater element is a thermocapillary tube providing heating as a function of the magnitude of heating current flowing through said thermocapillary tube.

The invention also provides a method of regulating the flow rate at which propellant fluid is fed to an electrical thruster of a space vehicle by means of a flow rate regulator comprising a heater element controlled by a computer and adapted to heat the propellant fluid at the outlet from a tank so as to modify its physical properties and thus modify the flow rate leaving the tank;

the method being characterized in that a plurality of empirical calibration curves are determined so as to define the propellant fluid flow rate as a function of the magnitude of the heating and as a function of environmental parameters, said calibration curves being loaded into the computer so that it also performs a function of determining the flow rate of propellant fluid.

The empirical calibration curves are typically determined on the ground by testing said regulator system under various conditions of temperature and pressure.

In a particular implementation, a plurality of semi-emprirical calibration curves are also calculated from said empirical calibration curves, said theoretical calibration curves being loaded into the computer.

In a particular implementation, while the flow rate regulator is in use, said computer uses said empirical calibration curves to calculate a semi-empririrical calibration curve defining the flow rate of propellant fluid as a function of the magnitude of heating and of environmental parameters.

SUMMARY OF THE FIGURES

Other characteristics, objects, and advantages of the invention appear from the following description, which is purely illustrative and nonlimiting, and which should be read with reference to the accompanying figures, in which.

DETAILED DESCRIPTION

Figure 1:
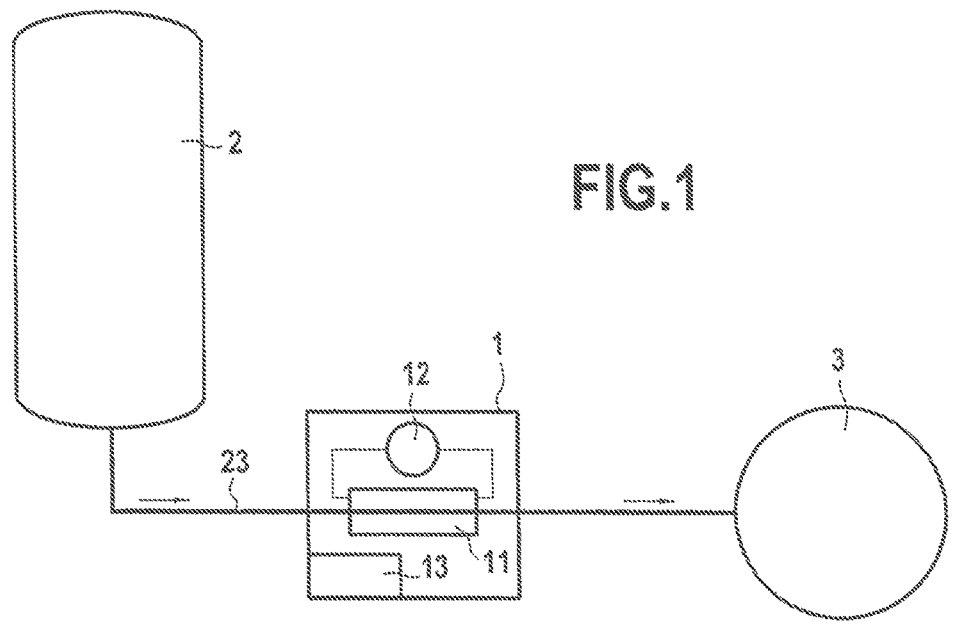
FIG. 1 is a diagram of a system in an aspect of the invention.

FIG. 1 shows diagrammatically a system in an aspect of the invention.

FIG. 1 shows a system for regulating the flow rate between a tank 2 of propellant fluid and an electrical thruster 3 that are connected together by a duct 23 having a flow rate regulator 1 arranged thereon.

By way of example the electrical thruster is a Hall effect engine, a pulsed plasma thruster, an ion thruster, or more generally any electrical thruster using a propellant fluid.

The flow rate regulator 1 comprises a heater element 11, typically powered by a generator 12 and controlled by a computer 13. The heater element 11 applies direct or indirect heating to the propellant fluid flowing in the duct 23, with the magnitude of the current being controlled by the computer 13. The flow rate regulator 1 is typically arranged at the outlet from the tank 2.

Heating the propellant fluid serves to modify the physical properties of the propellant fluid, thereby modifying head losses in the duct 23, and thus modifying the flow rate of propellant fluid that is conveyed to the electrical thruster 3. The higher the temperature of the propellant fluid, the more its viscosity increases, and thus the lower the flow rate of propellant fluid in the duct 23.

The heater element 11 may be of various types.

By way of example, it may be a thermocapillary tube heating the duct 23 as a function of the heating current flowing through said thermocapillary tube, the heating current then being delivered by the generator 12 under the control of the computer 13. The propellant fluid flowing in the duct 23 is thus heated indirectly by the thermocapillary tube, which heats it via the duct 23. This embodiment is shown in FIG. 1.

By way of example, the thermocapillary tube is then in the form of a coil or a spiral in order to increase the heating area in comparison with a straight section.

The heater element 11 may also be a resistance element arranged in the duct 23, serving to heat the propellant fluid in the duct 23 directly as a function of the heating current passing through the resistance element, with the heating current then being delivered by the generator 12 under the control of the computer 13.

The heater element 11 may also be a heat exchanger, e.g. a fluid-fluid type heat exchanger, having a heat-transfer fluid flowing therethrough at a temperature that is controlled by the computer 13 so as to exchange heat with the propellant fluid flowing in the duct 23 in order to bring it to the desired temperature.

In the present invention, the computer 13 is configured also to act as a flowmeter, delivering accurate information about the flow rate of propellant fluid in the duct 23 as a function of the magnitude of the heating applied to the propellant fluid by the heater element 11.

The computer 13 has a plurality of empirical calibration curves that are determined empirically and that define the flow rate of the propellant fluid as a function of the magnitude of heating and as a function of environmental parameters such as ambient temperature and ambient pressure, in particular. These empirical calibration curves are loaded into a storage memory of the computer 13 so as to be available for use while the system is in operation. These empirical calibration curves are loaded into a storage memory of the computer 13.

The computer 13 is thus configured so as to have a bundle of empirical curves defining the flow rate value as a function of the magnitude of the heating and as a function of the various environmental parameters taken into consideration. Together, these empirical curves form a series of plots that enable the flow rate to be determined.

Thus, as a function of the environmental parameters during use, e.g. as a function of parameters such as the temperature of the system and the pressure at the inlet to the system, the computer 13 determines the appropriate calibration curve and determines the flow rate of the propellant fluid in the duct 23 as a function of the magnitude of the heating applied by the heater element 11. For example, on the basis of the temperature of the system, the pressure at the inlet to the system, and the current applied to the heater element 11, the computer 13 determines which curve loaded in its storage memory is the closest to these various parameters, and thus deduces therefrom the value of the flow rate at this instant.

The flow rate regulator 1 thus performs a flowmeter function by means of its computer 13, without requiring additional components to be added, thereby minimizing the overall mass of the system.

By way of example, the empirical calibration curves are determined on the ground by testing the flow rate regulator system under various artificially-applied environmental parameters that substantially reproduce the environmental parameters to which the flow rate regulator system will be subjected while it is in use on a space vehicle.

Figure 2:
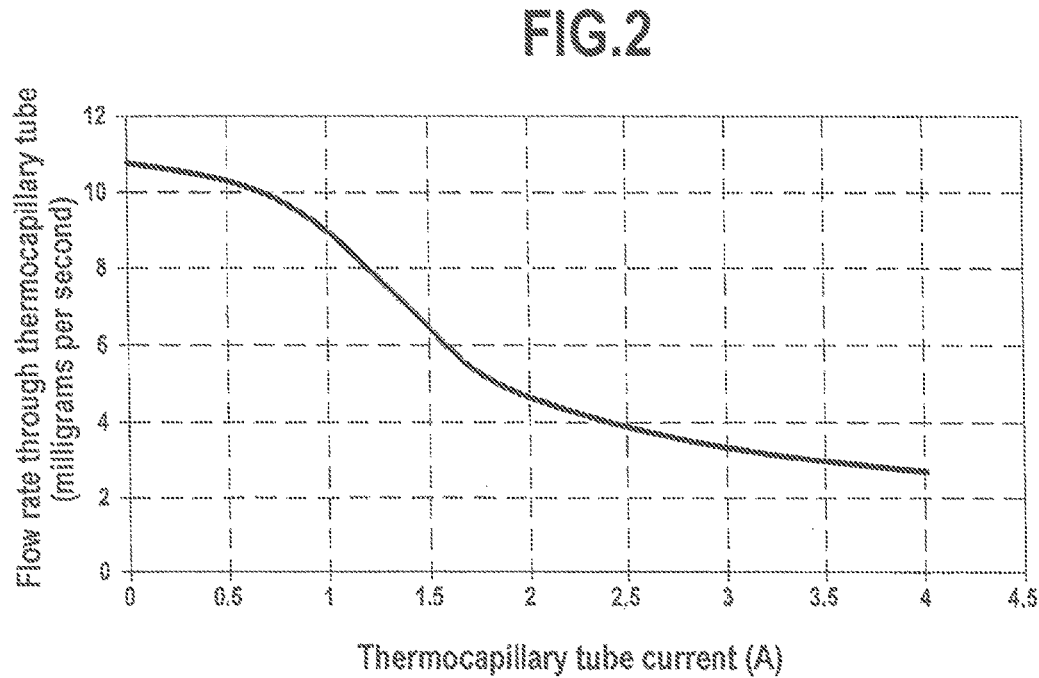
FIG. 2 shows an example of an empirical curve for calibrating flow rate as a function of the applied heating current.

FIG. 2 shows an example of an empirical curve for calibrating flow rate as a function of the applied heating current, for given environmental parameters. This curve was obtained while using the thermocapillary tube as a heater element, and it shows the flow rate passing through the thermocapillary tube as a function of the current passing in the thermocapillary tube, which is representative of the magnitude of the heating.

Thus, as a function of the variation in the heating current applied for a duration T, the computer 13 can determine the quantity of propellant fluid that has passed through the flow rate regulator 1 during this duration T.

Such curves set up a relationship between the heating current and the flow rate that is more accurate than general theoretical formulas, which present poor accuracy and do not enable the flow rate of the propellant fluid to be determined accurately as a function of variation in the various environmental parameters, such as ambient temperature and pressure, for example.

In advantageous manner, a plurality of semi-empirical calibration curves are established on the basis of various empirical calibration curves obtained during testing, so as to have smaller increments between any two successive curves, and thus greater accuracy, while not requiring an excessive number of tests.

By way of example, these semi-empirical calibration curves are obtained by assuming that variation between two empirical calibration curves is linear.

For example, if consideration is given to two theoretical calibration curves for variation in the flow rate as a function of the heating current, as obtained for two distinct pressure values P1 and P2, and while the other environmental parameters are kept constant, it is possible to obtain smaller increments for pressure values lying in the range P1 to P2 on the basis of these two empirical calibration curves. Naturally, the same principle can also be applied for parameters other than pressure, e.g. ambient temperature.

These semi-emprirical calibration curves can be obtained by a calculation unit on the ground after the empirical calibration curves have been obtained, and they can then be loaded into the computer 13.

These semi-emprirical calibration curves may also be obtained directly by the computer 13 as a function of the conditions of use of the regulator system. Thus, advantageously only the empirical calibration curves are then loaded into the computer, thereby reducing the amount of memory required for storing the information.

The present invention thus makes it possible to perform the flow rate function by the flow rate regulator 1 without requiring additional components to be added, and thus without adding to the total mass of the system, while nevertheless conserving accurate determination of flow rate.

The invention claimed is:

1. A system for regulating a flow rate of a propellant fluid of a space vehicle, said system comprising:
    an electrical thruster
    a tank of propellant fluid and
    a flow rate regulator connected to an outlet of said tank;
    wherein said flow rate regulator further includes
        a heater element controlled by a computer and configured to heat said propellant fluid and
            modify said propellant fluid physical properties to vary said flow rate of said propellant fluid leaving said tank;
    wherein said computer further includes a storage memory having loaded therein a plurality of empirical calibration curves that define said flow rate of said propellant fluid as a function of magnitude of heating and as a function of environmental parameters, so that said computer also determines said flow rate of said propellant fluid.

2. The system according to claim 1, wherein said plurality of empirical calibration curves are determined during ground testing of said system under various environmental parameters.

3. The system according to claim 1, wherein said computer has a plurality of semi-empirical calibration curves are calculated on the basis of said plurality of empirical calibration curves, said semi-calibration curves defining said flow rate of said propellant fluid as a function of magnitude of heating for environmental parameters that are different from those of said plurality of empirical calibration curves.

4. The system according to claim 1, wherein said computer is configured to use said plurality of empirical calibration curves to calculate a semi-empirical calibration curve defining said flow rate of said propellant fluid as said function of magnitude of heating and as said function of environmental parameters.

5. The system according to claim 1, wherein said heater element is a thermocapillary tube providing heating as a function of magnitude of heating current flowing through said thermocapillary tube.

6. The system according to claim 1, wherein said propellant fluid is xenon.

7. A method of regulating a flow rate at which propellant fluid is fed to an electrical thruster of a space vehicle by means of a flow rate regulator, wherein said flow rate regulator further includes a heater element controlled by a computer, said method comprising:
    heating, via said heater element, said propellant fluid at an outlet from a tank
    modifying said propellant fluid physical properties to vary said flow rate of said propellant fluid leaving said tank;
    regulating, via said flow rate regulator, said flow rate at which said propellant fluid is fed to said electrical thruster, wherein a plurality of empirical calibration curves define said propellant fluid rate as a function of magnitude of heating and as a function of environmental parameters, said plurality of empirical calibration curves being loaded into the computer so that said computer also performs a function of determining said flow rate of said propellant fluid.

8. The method according to claim 7, wherein determining said plurality of empirical calibration curves during ground testing a system under various environmental parameters.

9. The method according to claim 7, wherein determining a plurality of semi-empirical calibration curves by interpolation from said plurality of empirical calibration curves; and
    loading a plurality of theoretical calibration curves into said computer.

10. The method according to claim 7, wherein while using said flow rate regulator, said computer calculating a semi-empirical calibration curve defining said flow rate of said propellant fluid as said function of the magnitude of heating and as said function of environmental parameters based on said plurality of empirical calibration curves.

* * * * *